(12) United States Patent
Heiskari

(10) Patent No.: US 7,086,010 B1
(45) Date of Patent: Aug. 1, 2006

(54) THREE-DIMENSIONAL GRAPHICAL ICON APPEARANCE IN DISPLAYS OF ELECTRONIC DEVICES

(75) Inventor: Heli Heiskari, Turku (FI)

(73) Assignee: Nokia Mobile Phones, Ltd., Espoo (FI)

( * ) Notice: Subject to any disclaimer, the term of this patent is extended or adjusted under 35 U.S.C. 154(b) by 563 days.

(21) Appl. No.: 09/717,784

(22) Filed: Nov. 21, 2000

(51) Int. Cl.
*G06F 3/00* (2006.01)

(52) U.S. Cl. ....................................... 715/836

(58) Field of Classification Search ........ 345/419–427, 345/976, 835–839; 715/836
See application file for complete search history.

(56) References Cited

U.S. PATENT DOCUMENTS

| | | | | |
|---|---|---|---|---|
| 5,680,558 A | * | 10/1997 | Hatanaka et al. ............ | 345/838 |
| 5,923,327 A | * | 7/1999 | Smith et al. ................. | 345/784 |
| 6,226,367 B1 | * | 5/2001 | Smith et al. ............ | 379/142.04 |
| 6,377,261 B1 | * | 4/2002 | Fernandez et al. .......... | 345/467 |
| 6,415,320 B1 | * | 7/2002 | Hess et al. ................... | 709/219 |
| 6,448,984 B1 | * | 9/2002 | Smith et al. ................ | 715/781 |
| 6,453,281 B1 | * | 9/2002 | Walters et al. .............. | 704/200 |
| 6,501,490 B1 | * | 12/2002 | Bell ............................ | 345/837 |
| 6,563,502 B1 | * | 5/2003 | Dowling et al. ......... | 345/469.1 |

FOREIGN PATENT DOCUMENTS

WO    0057617    9/2000

OTHER PUBLICATIONS

Screen Dumps of Microsoft Excel 2000, 1999 (pp. 1-3).*

* cited by examiner

*Primary Examiner*—Kristine Kincaid
*Assistant Examiner*—L V Nguyen

(57) ABSTRACT

A strong three-dimensional icon is created for low-resolution displays such as used in portable communication devices by alternating light and dark stripes, with some stripes changing from light to dark and back to light to indicate a shadow, and other stripes from dark to light and back to dark to indicate a highlight. Altogether, the light and dark stripes with shadows and highlights provide the icon with a strong three-dimensional appearance.

15 Claims, 4 Drawing Sheets

THREE-DIMENSIONAL GRAPHICAL ICON APPEARANCE IN DISPLAYS OF ELECTRONIC DEVICES

BACKGROUND OF THE INVENTION

1. Field of the Invention

The invention relates to user interface graphics for mobile phones or other portable electronic devices with displays.

2. Description of the Related Art

For low-resolution displays of portable communication devices, images presented thereon have in the past had strong two-dimensional characteristics. It would be advantageous to add value to the display of images for such devices to give a more three-dimensional effect and thereby increase the impact of the imagery presented.

BRIEF SUMMARY OF THE INVENTION

An object of the present invention is to make possible the presentation of low-resolution images with strong three-dimensional effect.

According to a first aspect of the invention, a computer-readable medium encoded with a data structure for use in providing a graphical icon for display on a display of a portable communications device is characterized in that said data structure is encoded as digital data indicative of said graphical icon defined by alternating light and dark stripes, that selected stripes of said light and dark stripes change from light to dark and back to light to indicate a shadow adjacent an edge of said icon and from dark to light and back to dark to indicate a highlight adjacent another edge of said icon, and that altogether said light and dark stripes with shadows and highlights provide said icon with a three-dimensional appearance.

According to a second aspect of the invention, a communication device comprises means responsive to an event in the communication device for providing an event signal, a computer readable medium encoded with a data structure for use in providing a graphical icon for display on a display of a portable communications device, wherein the data structure is encoded as digital data indicative of said graphical icon defined by alternating light and dark stripes, wherein selected stripes of said light stripes change from light to dark and back to light to indicate a shadow adjacent an edge of said icon and from dark to light and back to dark to indicate a highlight adjacent another edge of said icon, and that altogether said light and dark stripes with shadows and highlights provide said icon with a three-dimensional appearance, and means responsive to the event signal for retrieving the digital data from the computer-readable medium and causing said display of said graphical icon on said display according to said retrieved digital data.

According to a third aspect of the invention, a method of displaying an icon on a portable communication device comprises the steps of retrieving, in response to an event signal, digital data from a computer-readable medium, and displaying said icon in response to said digital data retrieved from said computer-readable medium, wherein said digital data is indicative of said icon defined by alternating light and dark stripes, that selected stripes of said light and dart stripes change from light to dark and back to light to indicate a shadow adjacent an edge of said icon and from dark to light and back to dark to indicate a highlight adjacent another edge of said icon, and that altogether said light and dark stripes with shadows and highlights provide said icon with a three-dimensional appearance.

Further according to the first, second and third aspects of the invention, said digital data is encoded according to a portable bitmap file format.

Still further according to the first, second and third aspects of the invention, said digital data is encoded according to a portable graymap file format.

Further still according to the first, second and third aspects of the invention, said digital data is encoded according to a portable color image file format.

These and other objects, features and advantages of the present invention will become more apparent in light of the detailed description of a best mode embodiment thereof, as illustrated in the accompanying drawing.

DETAILED DESCRIPTION OF THE INVENTION

Figure 1:
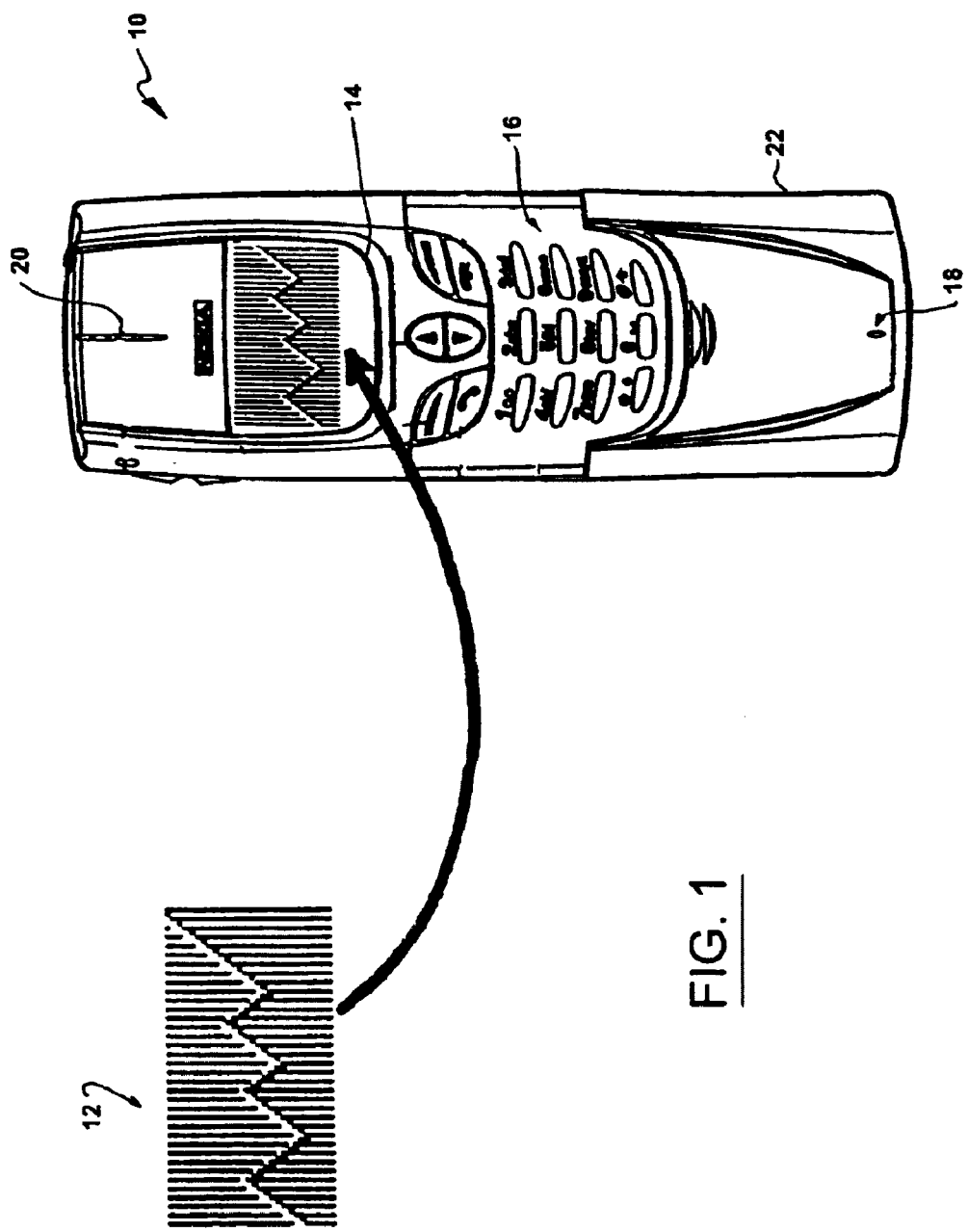
FIG. 1 shows a mobile communication device, according to the present invention, with a graphical icon defined by alternating light and dark stripes.

FIG. 1 shows a communication device 10 in the form of a mobile station or wireless user terminal such as, but not limited to, a cellular radio telephone or personal communicator that is suitable for displaying an image 12, according to the present invention. The image 12 is defined by alternating light and dark stripes, as shown. Selected stripes change from light to dark and back to light to indicate a shadow adjacent to an edge of a feature of the icon. Stripes also change from dark to light and back to dark to indicate a highlight adjacent another edge of a feature of the icon. Altogether, the light and dark stripes with shadows and highlights provide the icon with a three-dimensional appearance, much like a bas-relief.

The communication device 10 of FIG. 1 includes a display 14, a keypad 16, a microphone 18 and a speaker 20. An antenna is located behind the speaker at the back of the device 10 and is not shown in FIG. 1. The keypad 16 may be covered by a sliding cover 22 when the keypad is not in use.

It is noted from the icon 12 of FIG. 1 that the image there shown is of a graph, for instance of a stock price over time and has a strong three-dimensional effect on the viewer which makes the image of the graph stand out more than it otherwise would if it had been rendered as a simple two-dimensional graph, as has been the case in the prior art.

Figure 2A:
FIG. 2A shows an "outdoor" graphical icon, according to the present invention.

Some examples of such images will now be shown. For instance, FIG. 2A shows a scene of a city which can be used as an icon to symbolize an "outdoor" context for an application of the device 10. As can be seen, it is made up of vertical stripes that alternate between light and dark. Selected stripes are interrupted and change from dark to light or vice versa and may change back again, although not necessarily. These changes from light to dark in a given stripe permit the designer to create effects of highlighting and shadowing on the displayed objects in order to suggest the presence of an imaginary light source casting light from a given direction toward the objects. In FIG. 2A, the imaginary light source is coming from the upper left and therefore the highlighting occurs on the left-hand side of the buildings illustrated, while shadowing occurs on the right-hand side.

Figure 2B:
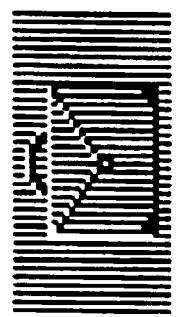
FIG. 2B shows a "meeting" graphical icon, according to the present invention.

Similarly, FIG. 2B shows a "meetings" icon which is also made up of vertical stripes alternating between light and dark. Again, an imaginary light source to the upper left creates highlighting to the left and top of the illustrated briefcase, while shadowing occurs at the bottom and right-hand side thereof. A given vertical stripe may change from dark to light or light to dark and back again, or stay the same.

Figure 2C:
FIG. 2C shows a "silent" graphical icon, according to the present invention.

FIG. 2C shows a "silent" in the form of a water lily with an imaginary light source coming from directly above. The outstretched leaves of the lily are highlighted at the top edges thereof and are shadowed underneath. Each "leaf" can be thought of as a feature of an iconic representation of a water lily, which is made of alternating light and dark vertical stripes, according to the present invention.

Figure 2D:
FIG. 2D shows a "footprint" graphical icon, according to the present invention.

FIG. 2D shows a "footprint" icon with alternating light and dark vertical stripes, according to the present invention. A given light or dark stripe can change from dark to light or light to dark and remain that way or change back to the original shade. The footprint is shown illuminated from directly above by an imaginary light source, the same way as in FIG. 2C, with shadowing underneath.

Figure 2E:
FIG. 2E shows a "butterfly" graphical icon, according to the present invention.
Figure 2F:
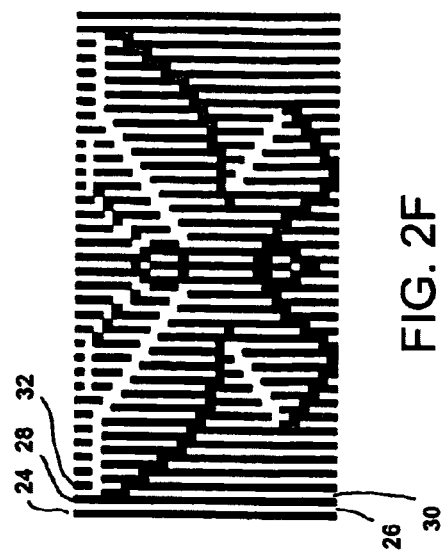
FIG. 2F shows an enlarged view of FIG. 2E to better illustrate the alternating light and dark stripes, according to the present invention.

FIG. 2E shows a "butterfly" icon, again illuminated from above, and made up of alternating light and dark vertical stripes, according to the present invention. FIG. 2F shows an enlargement of FIG. 2E in order to better appreciate the changing of the vertical stripes. For instance, a first dark stripe 24 at the left edge stays dark throughout the full extent thereof. The same can be said for the second stripe 26, which is a light-shaded stripe that does not change throughout its extent. A third stripe 28 which is dark shaded also does not change and remains dark throughout. A fourth stripe 30 is light colored for most of its extent, but includes a short dark portion near the top and which indicates a shadow adjacent an edge of the icon of the butterfly, i.e., a shadow under the tip of its left wing. The light-shaded vertical stripe 30 starts out as light shaded and then changes to dark shaded and changes back again to light shaded. A next stripe 32 is dark shaded for most of its extent, but has a short part near the top that is used to indicate a highlight at the top tip of the left wing of the butterfly icon. This is an instance of a dark-shaded stripe changing from dark to light and back to dark again to indicate a highlight adjacent another edge of the icon of the butterfly. Altogether, these alternating light and dark stripes with parts indicating shadows and highlights provide the icon with a strong three-dimensional appearance.

All of these icons resemble scupltural reliefs in which the projection from the surrounding surface is slight and no part of the modeled form is undercut.

Figure 3:
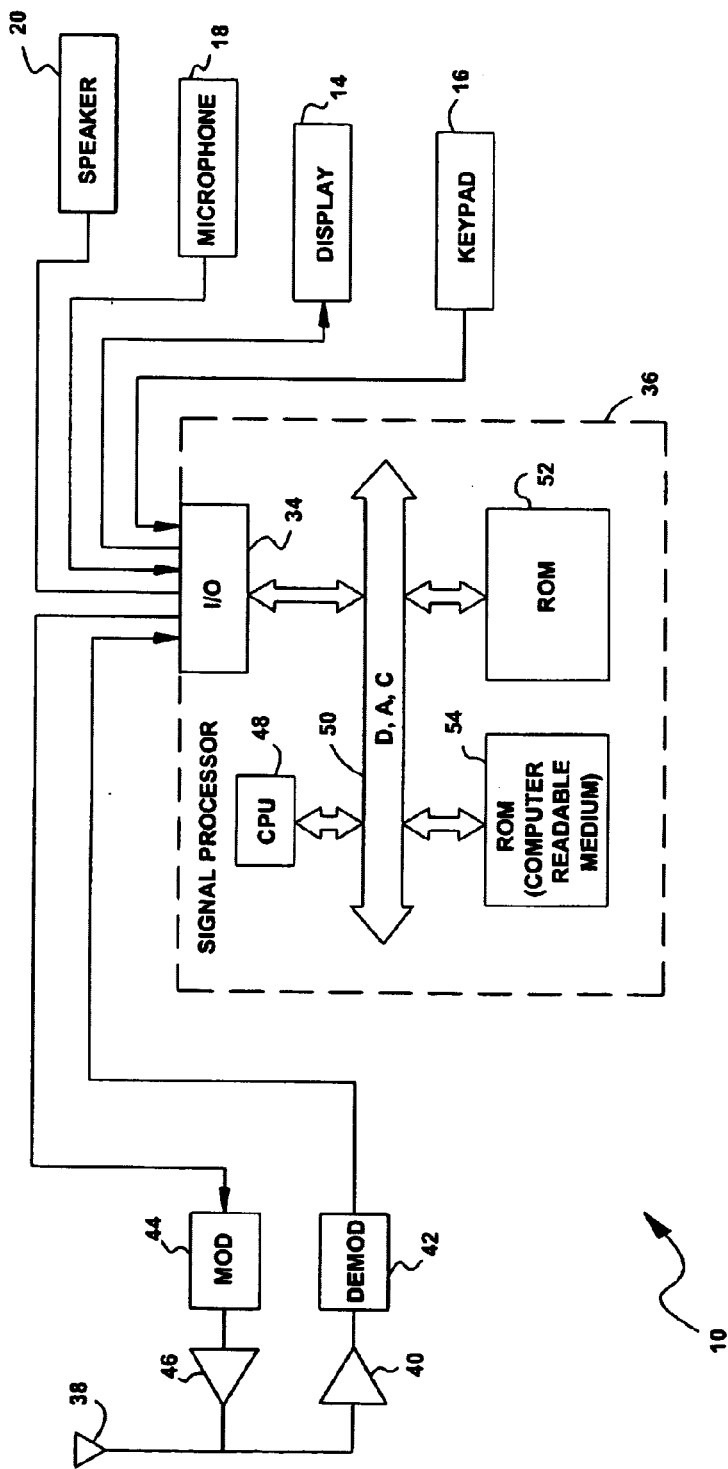
FIG. 3 shows a portable communication device, according to the present device.

FIG. 3 shows the communication device of FIG. 1 as schematic block diagram. The previously-mentioned display 14, keypad 16, microphone 18 and speaker 20 are shown to the right of FIG. 3. They are connected to an input/output (I/O) port 34 of a signal processor 36 which is inside of the device 10. The I/O device is also connected to the previously-mentioned antenna 38 through a receiver 40 and demodulator 42, as well as a modulator 44 and transmitter 46.

The signal processor 36 includes a central processing unit (CPU) 48 connected to a data, address and control bus 50 which is also connected to a random access memory (RAM) 52 and a computer-readable medium 54, which may be a read-only memory (ROM), miniature hard drive, or other device capable of saving encoded digital data.

Figure 4:
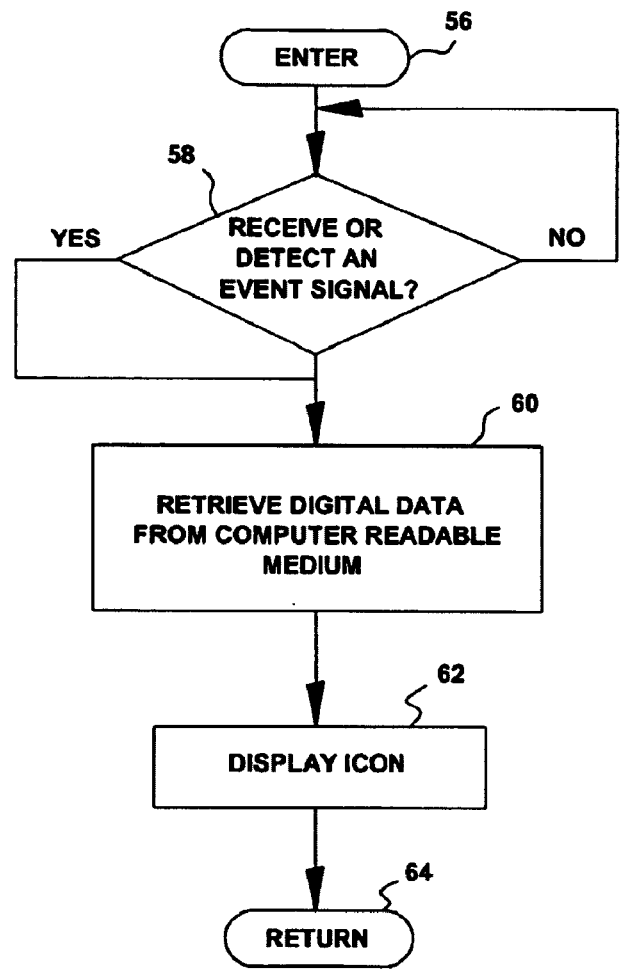
FIG. 4 shows a series of steps which may be carried out in the device of FIG. 3, according to the present invention.

The digital data stored in the computer-readable medium 54 may include a computer program such as shown in FIG. 4 for displaying three-dimensional icons according to the present invention, such as those shown in FIGS. 2A–2F. Such a program can take the form shown in FIG. 4, but not necessarily. It can take other forms which would be equally valid for retrieving digital data representative of three-dimensional icons, according to the present invention. In any event, after entering in a step 56, a decision is made in a step 58 as to whether or not the signal processor 36 has received or has detected an event which would call for the display of a three-dimensional icon according to the present invention. Such an event might be an internal event within the signal processor or may be an external event, such as the depression of a button on the keypad or the reception of a signal over the antenna 38, or some other event or combination thereof. If not, the step is re-executed indefinitely. Such a program can be running in background in conjunction with other processes being executed in a multi-processing environment or can be exited and returned to periodically. If such an event is detected, a step 60 is executed to retrieve digital data stored in the computer-readable medium 54 indicative of a three-dimensional icon according to the present invention. The signal processor 36 then causes the retrieved digital data to be displayed on the display 14, as indicated by a step 62, e.g., by a graphics controller. A return is then made in a step 64 for further processing.

The computer-readable medium is encoded with a data structure for use in providing the three-dimensional graphical icon of the present invention. The data structure is encoded as digital data indicative of the graphical icon defined by alternating light and dark stripes. Selected stripes of the light and dark stripes change from light to dark. They may also change back to light again to indicate a shadow adjacent an edge of the icon. Stripes may also change from dark to light and stay that way or change back again to dark to indicate a highlight adjacent another edge of the icon. Altogether, the light and dark stripes with shadows and highlights provide the icon with a strong three-dimensional appearance.

The data structure stored in the computer-readable medium may be encoded according to a portable bitmap file format known in the art as "pbm". It is a lowest common denominator monochrome file format. Alternately, the structure can be encoded with other formats, such as "pgm" for portable graymap file format, or "ppm" for portable pixmap file format (lowest common denominator color image file format).

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A computer-readable medium encoded with a data structure for use in providing a graphical icon for display on a display of a portable communications device, characterized in that said data structure is encoded as digital data indicative of said graphical icon defined by alternating light and dark stripes, that a selected stripe of said light and dark stripes changes from light to dark and remains dark in a region bordering on at least a part of a dark segment of a neighbouring stripe, and beyond said dark segment said selected stripe remains dark or changes back to light to create a shadow adjacent to an edge of said icon, and a further selected stripe of said light and dark stripes changes from dark to light and remains light in a region bordering on at least a part of a light segment in said neighbouring stripe or in a further neighbouring stripe, and beyond said light segment said selected stripe remains light or changes back to dark to create a highlight adjacent to said edge or another edge of said icon, and that altogether said light and dark stripes with shadows and highlights provide said icon with a three-dimensional appearance.

2. The computer-readable medium of claim 1, characterized in that said data structure is encoded according to a portable bitmap file format.

3. The computer-readable medium of claim 1, characterized in that said data structure is encoded according to a portable graymap file format.

4. The computer-readable medium of claim 1, characterized in that said data structure is encoded according to a portable color image file format.

5. A communication device, comprising:
   means, responsive to an event in the communication device, for providing an event signal;
   a computer-readable medium encoded with a data structure for use in providing a graphical icon for display on a display of a portable communications device, wherein said data structure is encoded as digital data indicative of said graphical icon defined by alternating light and dark stripes, that a selected stripe of said light and dark stripes changes from light to dark and remains dark in a region bordering on at least a part of a dark segment of a neighbouring stripe, and beyond said dark segment said selected stripe remains dark or changes back to light to create a shadow adjacent to an edge of said icon, and a further selected stripe of said light and dark stripes changes from dark to light and remains light in a region bordering on at least a part of a light segment in said neighbouring stripe or in a further neighbouring stripe, and beyond said light segment said selected stripe remains light or changes back to dark to create a highlight adjacent said edge or another edge of said icon, and that altogether said light and dark stripes with shadows and highlights provide said icon with a three-dimensional appearance; and
   means, responsive to the event signal, for retrieving the digital data from the computer-readable medium and causing said display of said graphical icon on said display according to said retrieved digital data.

6. The device of claim 5, wherein said data is encoded according to a portable bitmap file format.

7. The device of claim 5, characterized in that said data structure is encoded according to a portable graymap file format.

8. The device of claim 5, characterized in that said data structure is encoded according to a portable color image file format.

9. Method of displaying an icon on a portable communication device, comprising the steps of:
   retrieving, in response to an event signal, digital data from a computer-readable medium, wherein said digital data is indicative of said icon defined by alternating light and dark stripes, that a selected stripe of said light and dark stripes changes from light to dark and remains dark in a region bordering on at least a part of a dark segment of a neighbouring stripe, and beyond said dark segment said selected stripe remains dark or changes back to light to create a shadow adjacent to an edge of said icon, and a further selected stripe of said light and dark stripes changes from dark to light and remains light in a region bordering on at least a part of a light segment in said neighbouring stripe or in a further neighbouring stripe, and beyond said light segment said selected stripe remains light or changes back to dark to create a highlight adjacent to said edge or another edge of said icon, and that altogether said light and dark stripes with shadows and highlights provide said icon with a three-dimensional appearance; and
   displaying said icon in response to said digital data.

10. The method of claim 9, wherein said digital data is encoded according to a portable bitmap file format.

11. The method of claim 9, wherein said digital data is encoded according to a portable graymap file format.

12. The method of claim 9, wherein said digital data is encoded according to a portable color image file format.

13. The computer-readable medium of claim 1, wherein said alternating light and dark stripes are vertical.

14. The device of claim 5, wherein said alternating light and dark stripes are vertical.

15. The method of claim 9, wherein said alternating light and dark stripes are vertical.

* * * * *